(12) United States Patent
Wymeersch et al.

(10) Patent No.: US 8,315,955 B2
(45) Date of Patent: Nov. 20, 2012

(54) METHOD AND APPARATUS FOR DETERMINING INPUTS TO A FINITE STATE SYSTEM

(75) Inventors: Henk Wymeersch, Boston, MA (US); Moe Z. Win, Framingham, MA (US); Faisal M. Kashif, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1404 days.

(21) Appl. No.: 11/977,749

(22) Filed: Oct. 25, 2007

(65) Prior Publication Data

US 2008/0140404 A1 Jun. 12, 2008

Related U.S. Application Data

(60) Provisional application No. 60/854,245, filed on Oct. 25, 2006.

(51) Int. Cl.
*G06F 15/18* (2006.01)
(52) U.S. Cl. .......................................................... 706/12
(58) Field of Classification Search ........................ None
See application file for complete search history.

(56) References Cited

U.S. PATENT DOCUMENTS

2004/0131107 A1 7/2004 Wang

OTHER PUBLICATIONS

Kask et al., Stochastic Local Search for Bayesian Networks, 1999, AISTAT, pp. 1-10.*
Yang, Z and Wang, X. "Turbo Equalization for GMSK Signaling Over Multipath Channels Based on the Gibbs Sampler," *IEEE Journal*, 19(9): 1753-1763 (2001).
Djurić, P.M. and Chun, J.H. "An MCMC Sampling Approach to Estimation of Nonstationary Hidden Markov Models," *IEEE Trans.*, 50(5): 1113-1123 (2002).
Perreau, S. and Duhamel, P., "On-Line Blind Equalization of the FIR Channels Using a Gibbsian Technique," IEEE Intl Conf., 5: 3613-3616 (1997).
Wintz, P.A., "Optimum Adaptive Reception for Binary Sequences," IEEE Trans., AES1-10(3): 334-339 (1970).
Kashif, F.M., "Factor Graphs and MCMC Approaches to Interative Equalization of Nonlinear Dispersive Channels," *Mass. Inst. Tech.*, 61-68 (2006).
International Preliminary Report on Patentability and Written Opinion of the International Searching Authority, for PCT US2007/022571, mailed on May 7, 2009.

* cited by examiner

*Primary Examiner* — David Vincent
(74) *Attorney, Agent, or Firm* — Hamilton, Brook, Smith & Reynolds, P.C.

(57) ABSTRACT

A method of equalization used to estimate a transmitted signal given a received output is presented herein. The equalization method involves modeling a transmission channel as a Hidden Markov Model (HMM). The HMM channel is evaluated as a finite state machine. A Markov Chain Monte Carlo technique of sampling and computation is then utilized to estimate the transmitted signal.

31 Claims, 10 Drawing Sheets

QPSK: Iteration 1, 2 and 3 of Forward-Backward equalizer for the nonlinear channel (indicated as FG-NLIE) are compared with the equalizer that only takes care of the linear ISI. Matched filter (MF) bound and the genie bound are also plotted for the sake of reference.

16-QAM: Iteration 1, 2 and 3 of Forward-Bachward equalizer for the nonlinear channel (indicated as FG-NLIE) are shown. Matched filter (MF) bound and the genie bound are also plotted for the sake of reference. The linear channel equalizer is not shown due to poor performance.

MCMC equalizers for QPSK: BEP vs SNR performance of all the four methods is compared with the Forward-Backward equalizer (indicated as FG).

MCMC equalizers for 16-QAM: BEP vs SNR performance of MCMC-III and MCMC-IV is compared with the Forward-Backward equalizer (indicated as FG).
Results are shown for different number of parallel Gibbs samplers (GS).

Computational complexity vs performance trade-off in MCMC methods: reducing $S_2$ from 2 to 1 decreases the performance by about 0.7 to 1 dB at high SNR's. Decreasing $S_2$ to 0 results in almost 2 dB drop in performance. Results presented in this figure correspond to MCMC-IV. Similar trends were observed for MCMC-I and MCMC-III.

Comparison of the computational cost of equalizers for the nonlinear channel in 16-QAM. MCMC methods have the same parameters and performance as described in the previous section.

METHOD AND APPARATUS FOR DETERMINING INPUTS TO A FINITE STATE SYSTEM

RELATED APPLICATIONS

This application claims the benefit of U.S. Provisional Application No. 60/854,245, filed on Oct. 25, 2006. The entire teachings of the above application are incorporated herein by reference.

GOVERNMENT SUPPORT

The invention was supported, in whole or in part, by the Office of Naval Research under Grant No. N00014-03-1-0489, and the National Science Foundation under Grant No. ANI-0335256. The Government has certain rights in the invention.

BACKGROUND OF THE INVENTION

In digital communications, a signal comprising a number of complex symbols is transmitted through a medium, or channel, to a receiver. Due to channel effects, noise, or non-linear components in a transmitter or receiver, the receiver typically observes a distorted version of the transmitted signal. Thus, the goal of the receiver is to recover the sequence of symbols transmitted by the transmitter from the received signal.

In an attempt to recover the original transmitted sequence of symbols, the receiver applies an equalizer to the received signal, which may comprise a digital representation of an analog waveform representing the signal received at the receiver. The equalizer may recover "hard" information (e.g., a direct estimate of the symbol sequence) or "soft" information (e.g., in the form of a probability distribution) corresponding to the transmitted signal. A well known equalization technique may be implemented in the form of a forward-backward equalizer, which determines a posteriori distributions of the transmitted symbols based on the received signal. Each symbol of the originally transmitted sequence may be determined by obtaining a mode of the a posteriori distributions for the corresponding symbol.

SUMMARY OF THE INVENTION

Although the forward-backward method of equalization may provide accurate estimates for each symbol of the transmitted symbol sequence, forward-backward equalization is typically a very complex process. Forward-backward equalization involves modeling the transmission channel as a Hidden Markov Model (HMM). The HMM evaluates a channel as a finite state machine, where the model has no knowledge, or memory, of its state. The complexity of the forward-backward method of equalization is directly related to the length of the transmitted symbol sequence, which may typically involve thousands of symbols, multiplied by a total number of possible states of the HMM channel, which may be in the order of hundreds or thousands of states. Thus, an equalization method of less complexity may be useful for some applications.

In an embodiment of the present invention, an apparatus and corresponding method for determining input sequence to a finite state system given, corresponding outputs and a statistical model of the finite state system, is presented.

The apparatus may include a sampler configured to sample from a distribution defined over the input sequence to the finite state system to provide a subset of sequences. The distribution may be a uniform distribution or a joint a posteriori distribution. The sampler may employ a Gibbs sampling technique. The sampler may be further configured to choose a sampling technique based on an error tolerance. The sampler may also be configured to delete duplicate samples from the subset of sequences.

The apparatus may also include a processor configured to apply a function to the samples to produce an output of the function. The function may be a joint a posteriori distribution, an indicator function, or a conditional marginal a posteriori distribution. The function may depend on a received signal. The processor may be further configured to choose the function based on an error tolerance.

The apparatus may also include a summing unit configured to sum the output of the function over at least a subset of the samples. The summing unit may also be configured to normalize a result of the summing to obtain an a posteriori distribution.

The apparatus may include a selecting unit configured to perform an arithmetic operation on the results of the summing to determine a most likely input sequence to the finite state system. The arithmetic operation may determine a mode of the distribution. The apparatus may also include a reporting unit configured to report the most likely input sequence. The apparatus may be configured to determine inputs across multiple time instants.

In an example embodiment of the present invention, the distribution may be a joint a posteriori distribution over all possible input sequences and the function may be an indicator function constraining the input sequence being considered at a given time instant.

In an example embodiment of the present invention, the distribution may be a uniform distribution defined over all input sequences. The function may be a joint a posteriori distribution defined over all the input sequences.

In an embodiment of the present invention, the distribution may be a joint a posteriori distribution over all possible input sequences. The function may include a conditional marginal a posteriori distribution of the input under consideration given the input sequences corresponding to all time instances, but not including a current time instant.

In an embodiment of the present invention, the distribution may be a joint a posteriori distribution for all input sequences. The function may include a joint a posteriori distribution defined over all possible input sequences. Additionally, all duplicate samples may be removed to produce distinct samples.

The system may further include choosing the distribution and the function based on a performance parameter of a system that includes the finite state system. The system may be employed in a communications system selected from the group consisting of: wireless, wire-line, free space optical, fiber-based optical, and storage system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
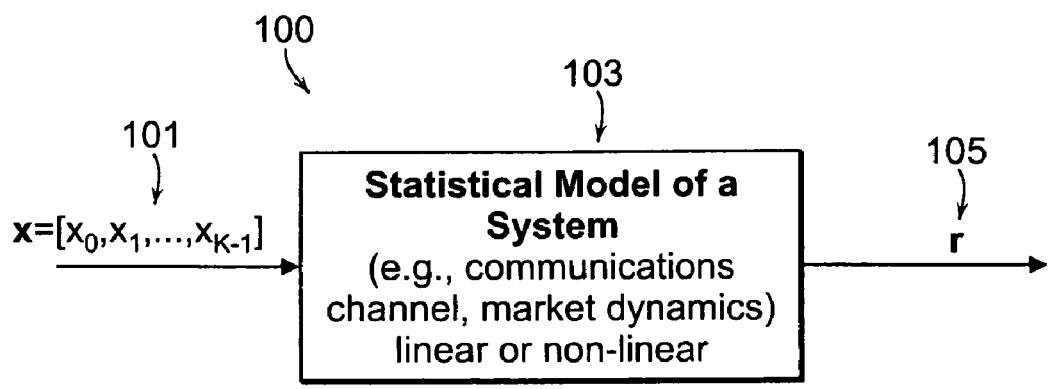
FIG. 1A is a diagram illustrating an overview of a data communications transmission system.

FIG. 1A illustrates a simplified example of a communications system 100. A transmitter (not shown) may transmit a signal as a sequence of K symbols 101 via a channel 103 to a receiver (not shown). The transmitted input 101 may include information based on an alphabet $\Omega^K$, where $\Omega$ may the alphabet for a single symbol. The channel may be a wired or wireless channel and may be employed in any number of processes, for example, market dynamics, speech processing, or bioinformatics. A receiver may obtain the transmitted signal in the form of a vector of symbols r 105. The output may take a similar form as the input, where the output may also include information based on an alphabet $\Omega^K$, however this is usually not the case.

Due to channel effects, noise, and/or non-linearities etc., the received signal may be a distorted version of the transmitted signal. Therefore, equalization methods in the receiver may be used to estimate the transmitted signal. These estimates may be in the form of a marginal a posteriori distributions $p_k(x_k|r)$, the probability distribution for the $k^{th}$ transmitted symbol, where $x_k$ represents a possible value of the $k^{th}$ transmitted symbol, and r is a vector of the received symbols.

Figure 1B:
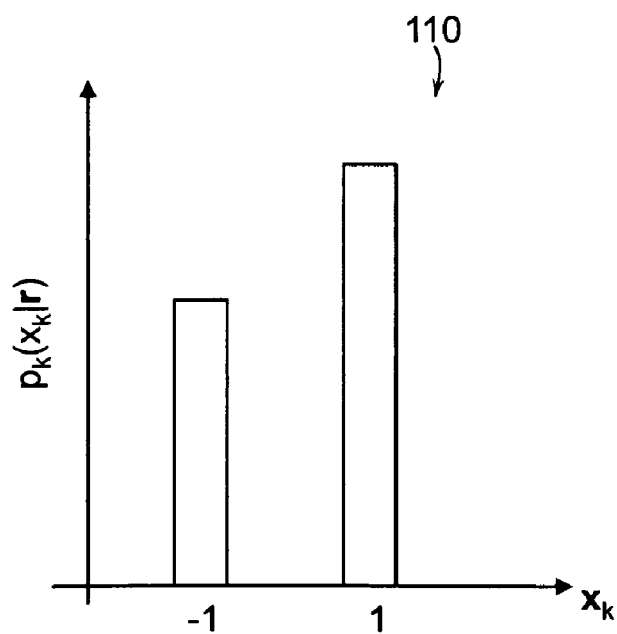
FIG. 1B is a bar graph illustrating an example of a marginal a posteriori distribution.

FIG. 1B is a graph 110 providing an illustrative example of the marginal a posteriori distribution of a symbol, such as $x_2$. The marginal a posteriori distribution may provide the probability of each possible value of a particular symbol. The set of possible symbol values $\Omega$ may be predetermined and well known prior the signal transmission. The y-axis of the graph of FIG. 1B provides the probability value, provided by the marginal a posteriori distribution, of the symbol $x_2$, given the received signal vector r. The x-axis of the graph of FIG. 1B provides each possible symbol value, which, in this example, includes −1 and 1. As shown in the graph, the symbol $x_2$ is more likely to be a value of 1.

Since the equalization methods require the marginal a posteriori distributions to provide probability estimations for every possible symbol in the transmitted signal, the complexity of these equalization methods may be significant. Thus, in an embodiment of the present invention, equalization methods that employ lesser computational complexity than forward-backward equalization methods are presented.

Figure 2:
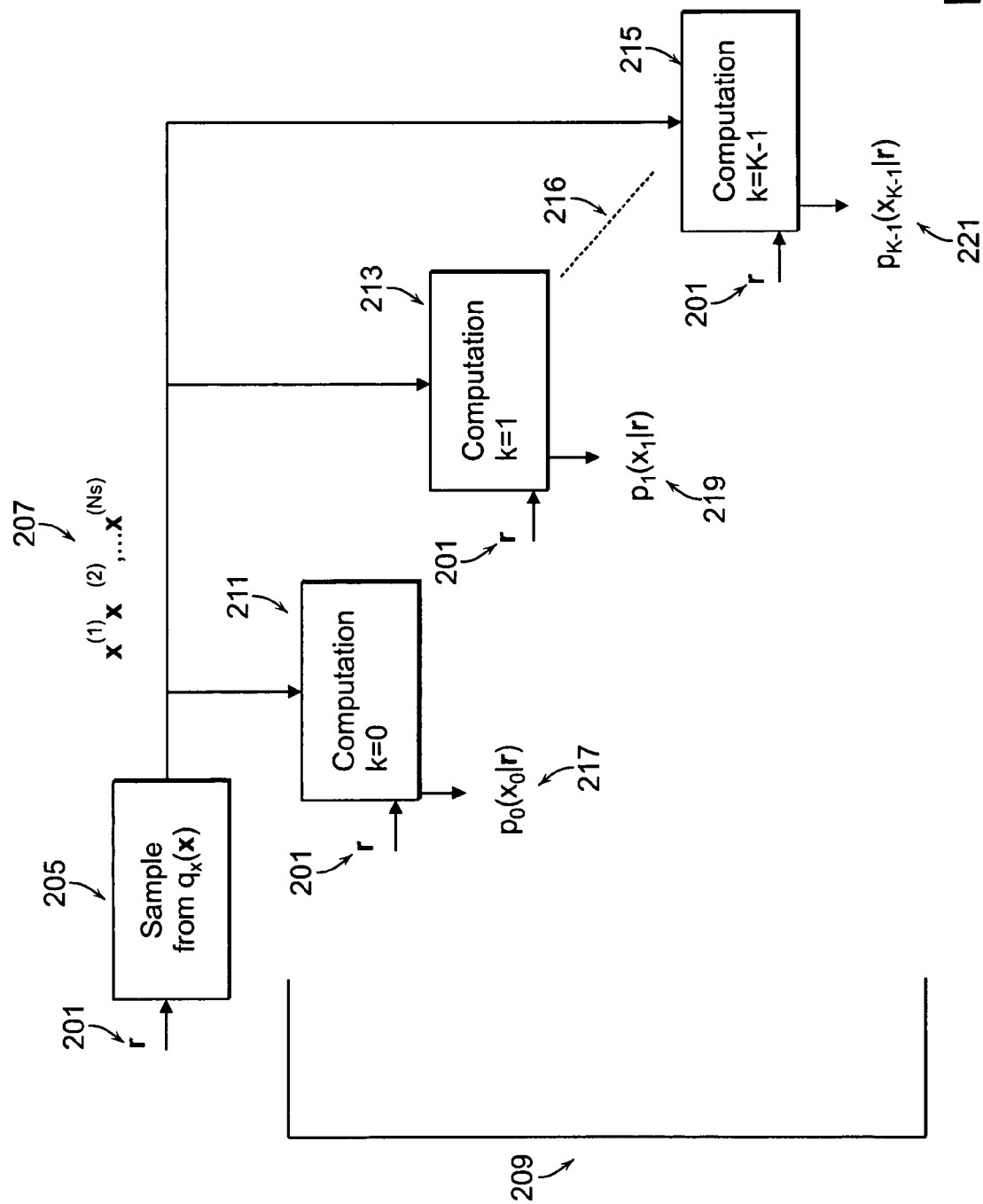
FIG. 2 is a block diagram illustrating an overview of an equalization technique employing Markov Chain Monte Carlo computation, according to an example embodiment of the present invention.
Figure 3:
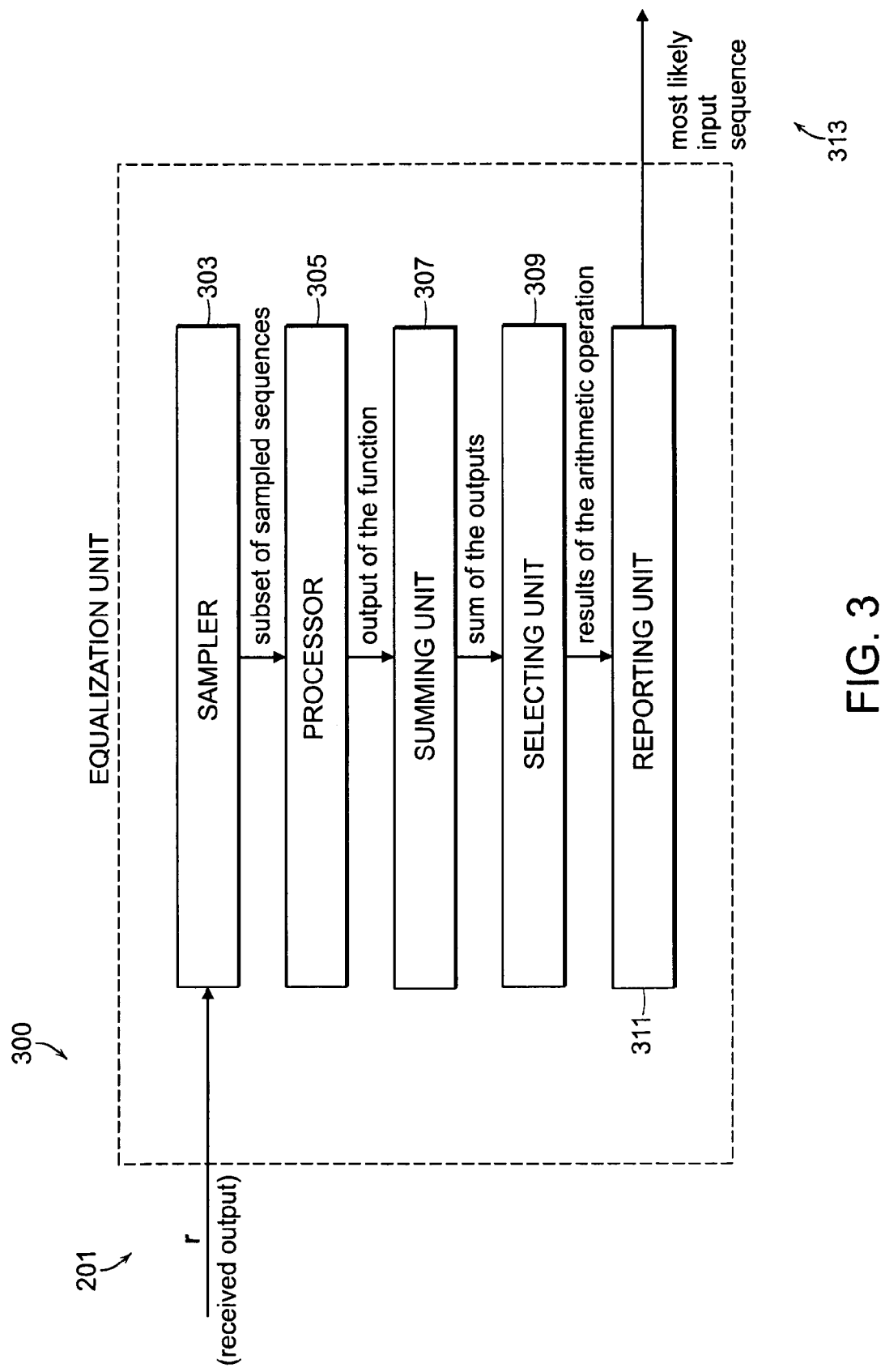
FIG. 3 is a block diagram depicting an equalization unit according to an example embodiment of the present invention.
Figure 4:
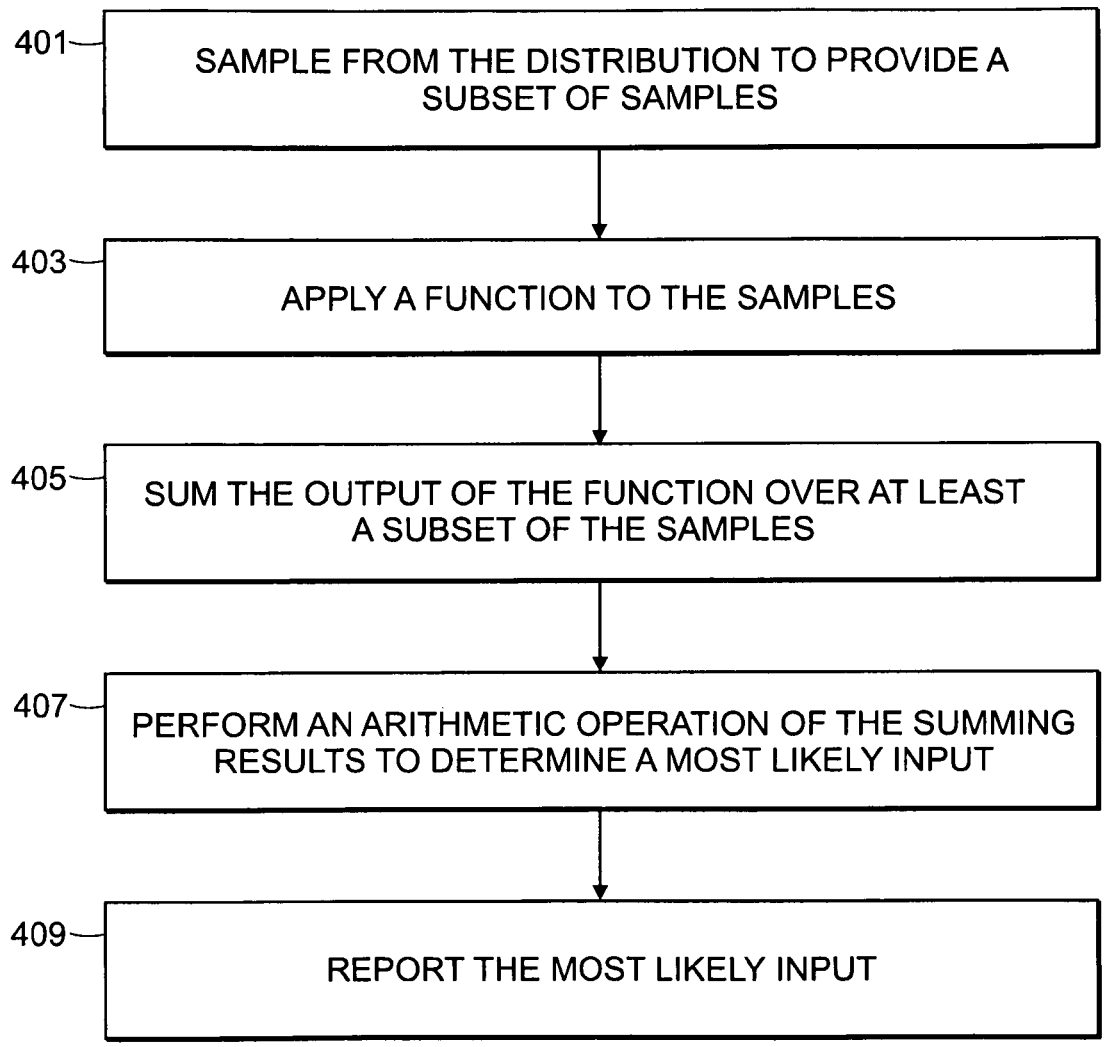
FIG. 4 is a flow diagram of example operations of the equalization unit of FIG. 3.

FIG. 2 is a block diagram that illustrates the process of determining approximated marginal a posteriori distributions utilized in determining values of the transmitted symbols, according to an embodiment of the present invention. FIG. 3 is a block diagram that illustrates an equalization unit, which may be associated with a receiver, that may be utilized in determining the values of the transmitted symbols. FIG. 4 is a flow diagram depicting example operations of the equalization unit of FIG. 3. FIGS. 2-4 describe a systematic, software, and hardware approach to equalization according to example embodiments of the present invention.

Referring to FIGS. 2-4, with reference numeral hundred series digits indicating which specific figure is being referenced, sampling 205 from a chosen distribution $q_x(x)$ may be performed, which may result in a random subset of the possible symbol sequences 207, where $N_s$ is the size of the subset, which may be predefined (401). The chosen distribution $q_x(x)$ may be in the form of a uniform distribution or a joint a posteriori distribution. The sampling may be performed in an equalization unit 300 via a sampler 303. The sampling may or may not take into account the received output signal r 201. The sampling may also be done in accordance to a Gibbs sampling method.

The distribution $q_x(x)$ may represent a distribution over all the possible symbol sequences. In choosing the size $N_s$ of the subset, a design trade-off may be made because the larger the size $N_s$, the more complex the computation may be. However, choosing a large $N_s$ may also yield more accurate estimates of the transmitted symbols.

Upon obtaining the subset of the possible symbol sequences 207, each sequence of the subset may put through a number of computations or functions 209 (403). The number of computations may equal the number of symbols K in the transmitted symbol sequence. Each computation may be related to a particular symbol in the transmitted sequence. A processor 305 of the equalization unit 300 may be utilized in applying the computation, or function, to the subset of sequences. For example, the first computation 211 may be related to the first symbol in the transmitted sequence (k=0), the second computation 213 may be related to the second symbol in the transmitted sequence (k=1), and the last computation 215 may be related to the last symbol in the transmitted sequence (k=K−1). It should be appreciated that although FIG. 2 only illustrates three computational operations associated with k values 0, 1, and K−1, computations may be used to obtain the marginal a posteriori distributions for remaining k values 216. A few examples of the functions which may be employed include, but are not limited to, a joint a posteriori distribution, an indicator function, or a conditional marginal a posteriori distribution. The received vector r of transmitted symbols 201 may be utilized by at least a subset of the computation operations.

The outputs of the function computations may be summed and normalized resulting in an approximation of the marginal a posteriori distribution associated with estimations of the various symbols of the sequence (405). The summing and normalizing may be performed by a summing unit 307. In summing the outputs of the computation function, previous states of the HMM are taken into account. Therefore, in an embodiment of the present invention, the sequence symbol estimation is done with knowledge, or memory, of previous states.

Upon summing and normalizing the output of the function computations (405), an arithmetic operation may be performed on the marginal a posteriori distribution in order to determine a most likely estimate of the individual symbols of the sequence. The arithmetic operation may be performed by a selecting unit 309. The arithmetic operation may include, but is not limited to, determining a maximum, mean, median, or mode, of the marginal a posteriori distribution. In an example embodiment of the present invention, the mode of the $k^{th}$ marginal a posteriori distribution may yield the estimate of the most likely value of the $k^{th}$ symbol (407). For example, the respective modes of the marginal a posteriori distributions 217, 219, and 221 may yield the most likely values of the k=0 symbol, the k=1 symbol, and the k=K−1 symbol, respectively.

Once the respective modes have been selected, a reporting unit 311 may be used to report the estimated symbol values of the transmitted signal (409). The estimated symbol sequence may be reported to a user or a system component.

In an embodiment of the present invention, four methods have been utilized for determining the marginal a posteriori distribution for the respective symbols. These methods involve sampling from a probability distribution and utilize the obtained sample for subsequent computations.

First Equalization Embodiment:

In an embodiment of the present invention, a Monte Carlo summation technique is utilized in obtaining the marginal a posteriori distributions for each symbol value in the transmitted sequence. A uniform distribution may be used as the $q_x(x)$ distribution. A uniform distribution typically comprises equal probability values for all the possible symbol sequences. For example, given the set of possible symbols in a sequence to be $\{-1, 1\}$ where K=3, the number of possible sequences will be eight ($2^3$=8). Therefore, the possible symbol sequences and corresponding probability values are as follows:

TABLE 1

| Possible Sequences | Probability Values |
| --- | --- |
| 1, 1, 1 | $\frac{1}{8}$ |
| 1, 1, −1 | $\frac{1}{8}$ |
| 1, −1, 1 | $\frac{1}{8}$ |
| −1, 1, 1 | $\frac{1}{8}$ |
| −1, −1, −1 | $\frac{1}{8}$ |
| −1, −1, 1 | $\frac{1}{8}$ |
| −1, 1, −1 | $\frac{1}{8}$ |
| 1, −1, −1 | $\frac{1}{8}$ | where each of the eight possible sequences has an equal probability value (⅛). Table [1] provides an illustrative explanation of the uniform distribution vector $q_x(x)$. It should be appreciated that the number of possible symbols (K) in a given sequence may typically be in the order of thousands, resulting in a very large number of possible sequences.

Using the uniform distribution vector $q_x(x)$, sampling may be performed to obtain the random subset of possible symbol sequences 207 of size $N_s$ (401). The sampling may be performed with use of a sampler 303 of an equalization unit 300. For example, consider that the subset size $N_s$ has been predetermined to equal three, a possible sub-set may be randomly chosen as follows:

TABLE 2

| Subset of Possible Sequences | Probability Values |
| --- | --- |
| 1, 1, −1 | $\frac{1}{8}$ |
| −1, 1, −1 | $\frac{1}{8}$ |
| 1, −1, 1 | $\frac{1}{8}$ |

TABLE 2-continued

| Subset of Possible Sequences | Probability Values |
| --- | --- |

Upon obtaining the subset of sequences 207, the subset may be applied to a computation function for each possible k value (403). A processor 305 may be used to apply the computation function to the subset of sampled sequences. In the current example provided by Table [2], three computations may be provided: a computation related to k=0, a computation related to k=1, and a computation related to k=2. In the computation related to k=0, all the sequences of the subset 207 may be evaluated. The computation function related to k=0 may be represented as follows:

$$p_0(x_0 | r) \propto \sum_{n=1}^{N_s} p(x_0, x_{\bar{0}}^{(n)} | r) \qquad \text{Equation [1]}$$

where $p_0(x_0|r)$ is an approximation the marginal a posteriori distribution for k=0, $p(x_0, x_{\bar{0}}^{(n)}|r)$ is the computation function which has been applied and may be in the form of a joint a posteriori distribution evaluated in $x=[x_0, x_{\bar{0}}^{(n)}]$. A joint a posteriori distribution $p(x|r)$ may describe the probability that a certain symbol sequence x was transmitted, given the received vector r. $x_{\bar{0}}^{(n)}$ is the sequence of length K−1 obtained by removing the k=0 element from the $n^{th}$ sequence in the subset of sequences. Upon obtaining the computational result from performing the computation of the equation [1], the obtained result may be summed and normalized in order to obtain the proper form of the marginal a posteriori distribution, which may be utilized in estimating the symbol values (405). The summing and normalization of the approximated marginal a posteriori distribution may be performed with use of a summing unit 307.

Once the proper form of the distribution has been obtained, an arithmetic operation may be performed with use of a selecting unit 309 (407). In an example embodiment, the arithmetic operation may be determining a mode of the distribution. By determining the mode of the proper marginal a posteriori distribution $p_0(x_0|r)$, the first symbol (k=0) of the transmitted sequence may be estimated.

Following the same logic, the second symbol of the transmitted sequence may be estimated by determining the arithmetic mode of the marginal a posteriori distribution $p_1(x_1|r)$. Therefore, the $k^{th}$ symbol of the transmitted sequence may be estimated by determining the arithmetic mode of the marginal a posteriori distribution $p_k(x_k|r)$.

Second Equalization Embodiment:

In another embodiment of the present invention, a Monte Carlo summation, known as a Markov Chain Monte Carlo technique is utilized. A joint a posteriori distribution may be used as the $q_x(x)$ distribution. Therefore, unlike the uniform distribution of the first equalization embodiment, the probability of each possible sequence may not be well defined or known. A Gibbs sampling technique may be used to obtain the random subset of possible symbol sequences 207 of size $N_s$ (401). A Gibbs sampling technique samples from K conditional marginal a posteriori distributions. This may be achieved without knowledge of the joint a posteriori distribution. The sampling may be performed with use of a sampler 303.

Once the random subset of possible symbol sequences 207 has been obtained, the K computation functions may be performed on the subset with use of a processor 305 (403). In an embodiment of the present invention, the applied computation function may be in form of an indicator function. Using the example subset provided in the Table [2], for the possible symbol values {1, −1}, the computation for k=0 may be represented as follows:

$$p_0(x_0 = 1 \mid r) \propto \sum_{n=1}^{Ns} I\{x_0^{(n)} = 1\} \qquad \text{Equation [2]}$$

$$p_0(x_0 = -1 \mid r) \propto \sum_{n=1}^{Ns} I\{x_0^{(n)} = -1\} \qquad \text{Equation [3]}$$

where $I\{x_0^{(n)}=1\}$ and $I\{x_0^{(n)}=-1\}$ represent the indication function $I\{P\}$, which may be defined as follows:

$$I\{P\} = \begin{cases} 0 & P = \text{false} \\ 1 & P = \text{true} \end{cases} \qquad \text{Equation [4]}$$

Therefore, using the sequences of the random subset 207, the k=0 symbol for each sequence listed in table [2] is evaluated with equations [2]-[4]. Since two of the k=0 symbols for the sequences listed in table [2] have the value of 1, the value of the summation of the indication function $I\{P\}$ of equation [2] equals 2. Thus, $p_0(x_0=1|r)$ also equals 2. Similarly, since only one of the k=0 symbols for the sequences listed in table [2] includes the value of −1, the value of the summation of the indication function $I\{P\}$ of equation [2] equals 1. Thus, $p_0(x_0=-1|r)$ also equals 1. The summation and normalizing of the outputs obtained by the computation function of equations [2] and [3] may be performed by a summing unit 307 (405).

Upon normalizing and evaluating the marginal a posteriori distributions $[p_0(x_0=-1|r)p_0(x_0=-1|r)]=[\frac{2}{3}\ \frac{1}{3}]$ for the possible symbols values for k=0, the symbol value at k=0 may be estimated to be 1 since the marginal a posteriori distribution associated with the value of 1 yields a greater probability. The remaining symbols may also be estimated in a similar fashion, where the estimated sequence may be determined as {1, 1, −1}. Therefore, in an example embodiment of the present invention, the estimations are obtained by performing an arithmetic operation on the summed results, where the arithmetic operation may be determining a maximum value of the distribution (407). The determination of the maximum value may be performed with use of a selecting unit 309.

Third Equalization Embodiment:

In another embodiment of the present invention, an alternative Markov Chain Monte Carlo technique may be employed. A joint a posteriori distribution may be used as the $q_x(x)$ distribution, where the probability of each possible sequence may not be well defined or known. A Gibbs sampling technique may be used to obtain the random subset of possible symbol sequences 207 of size $N_s$ (401). A Gibbs sampling technique samples from K conditional marginal a posteriori distributions. This may be achieved without knowledge of the joint a posteriori distribution. The sampling may be performed with use of a sampler 303.

Once the random subset of possible symbol sequences 207 has been obtained, the K computation functions may be applied to the subset (403). The computation functions may be used to provide an approximated marginal a posteriori distribution associated with the respective k value. The functions may be applied with use of a processor 305. The approximated marginal a posteriori distribution may be represented by:

$$p_k(x_k = w \mid r) \propto \sum_{n=1}^{Ns} p(x_k = w \mid x_{\bar{k}} = x_{\bar{k}}^{(n)}, r) \qquad \text{Equation [5]}$$

where w represents value in the set of possible symbols. Using the above example in relation to Tables [1] and [2], w∈{1,−1}. The expression $p(x_k=w|x_{\bar{k}}=x_{\bar{k}}^{(n)},r)$ is the applied computation function, which may be in the form of a conditional marginal a posteriori distribution, with respect to $x_k$, evaluating a conditional sequence. The expression $x_{\bar{k}}=x_{\bar{k}}^{(n)},r$ sets the condition and represents the evaluation of the sequence (n), in the subset, with respect to the received vector r with the exclusion of the $k^{th}$ symbol. Consider the example subset of sequences 207 shown in table [2], evaluated in the computation associated with k=0. Equation [5] may be rewritten with the following set of equations:

$$p_0(x_0 = 1 \mid r) \propto \sum_{n=1}^{Ns} p(x_0 = 1 \mid x_1^{(n)}, x_2^{(n)}, r) \qquad \text{Equation [6]}$$

$$p_0(x_0 = -1 \mid r) \propto \sum_{n=1}^{Ns} p(x_0 = -1 \mid x_1^{(n)}, x_2^{(n)}, r) \qquad \text{Equation [7]}$$

where the expression $p(x_0=1|x_1^{(n)}, x_2^{(n)},r)$ evaluates the conditional marginal a posteriori distribution for the likelihood of the presence of the conditional sequence under consideration and where the conditional sequence under consideration in equation [6] is each (n) sequence from Table [2] with the k=0 symbol value fixed at {1}. Similarly, the conditional sequence under consideration in equation [7] is each (n) sequence from table [2] with the k=0 symbol value fixed at {−1}. Therefore, upon evaluating each conditional sequence, the results of computation function may be summed and normalized, resulting in the marginal a posteriori distribution of $x_k$ (405). The summing and normalizing may be performed with use of a summing unit 307.

The estimated symbol value of $x_k$ may be obtained by performing an arithmetic operation of the marginal a posteriori distribution of $x_k$ (407). The arithmetic operation may be performed with use of a selecting unit 309. In an embodiment of the present invention, the arithmetic operation may be determining an arithmetic mode of the marginal a posteriori distribution of $x_k$ in order to provide an estimate of the symbol value of $x_k$.

Fourth Equalization Embodiment:

In another embodiment of the present invention, an alternative Markov Chain Monte Carlo technique may be employed. A joint a posteriori distribution may be used as the $q_x(x)$ distribution, where the probability of each possible sequence may not be well defined or known. A Gibbs sampling technique may be used to obtain the random subset of possible symbol sequences 207 of size $N_s$ (401). A Gibbs sampling technique samples from K conditional marginal a posteriori distributions. This may be achieved without knowledge of the joint a posteriori distribution. The sampling may be performed with use of a sampler 303. It should be appreciated that any sampling technique known in the art may be employed in obtaining the subset of sequences.

Upon obtaining the subset of sequences 207, duplicate sequences may be removed, resulting in a subset of distinct sequences of size $D_s$. The subset of sequences comprising a size $D_s$ may be applied to a computation function for each possible k value (403). The application of the computation function may be performed with use of a processor 305.

In the current example provided by Table [2], three computations may be provided: a computation related to k=0, a computation related to k=1, and a computation related to k=2. In the computation related to k=0, all the distinct sequences of the subset 207 may be evaluated. The computation related to k=0 may be represented as follows:

$$p_0(x_0 \mid r) \propto \sum_{n=1}^{D_s} p(x_0, x_{\bar{0}}^{(n)} \mid r) \qquad \text{Equation [8]}$$

where $p_0(x_0|r)$ is an approximation of the marginal a posteriori distribution for k=0, $p(x_0,x_{\bar{0}}^{(n)}|r)$ is the applied computation function which may be in the form of a joint a posteriori distribution evaluated in $x=[x_0,x_{\bar{0}}^{(n)}]$. A joint a posteriori distribution $p(x|r)$ may describe the probability that a certain symbol sequence x was transmitted, given the received vector r. $x_{\bar{0}}^{(n)}$ is the sequence of length K-1, obtained by removing the k=0 element from the $n^{th}$ sequence in the subset of sequences.

The outputs of the computation function of equation [8] may be summed and normalized in order to obtain a proper form of the marginal a posteriori distribution (405). The summing and normalizing may be performed with use of a summing unit 307.

The estimated symbol value of $x_k$ may be obtained by performing an arithmetic operation of the marginal a posteriori distribution of $x_k$ (407). The arithmetic operation may be performed with use of a selecting unit 309. In an embodiment of the present invention, the arithmetic operation may be used in determining a mode of the marginal a posteriori distribution of $x_k$ in order to provide an estimate of the symbol value of $x_k$.

For example, by determining the arithmetic mode of the calculated normalized marginal a posteriori distribution $p_0(x_0|r)$, the first symbol (k=0) of the transmitted sequence may be estimated. Following the same logic, the second symbol of the transmitted sequence may be estimated by determining the arithmetic mode of the marginal a posteriori distribution $p_1(x_1|r)$. Therefore, the $k^{th}$ symbol of the transmitted sequence may be estimated by determining the arithmetic mode of the marginal a posteriori distribution $p_k(x_k|r)$.

Experimental Results and Discussion:

As an example experimental exercise, the four equalizers mentioned above were implemented in a C++ based setup to analyze their performance and complexity. Two different modulation schemes, QPSK and 16-QAM were used for the purpose of these results, and a third-order Volterra structure was used to simulate the nonlinear channel dispersion. The details of the simulation results and analysis of the various cases of interest, and a comparison of the forward-backward (FG) process and the four equalizers presented herein will be discussed.

In the simulation set-up, the channel encoder uses a systematic convolutional code with rate ½, constraint length 4, and encoder polynomials: $D^4+1$, (feed-forward) and $D^4+D^3+D^2+D+1$, (feedback). A random bit-interleaver was used after the encoder. Results are presented for two different modulation schemes: gray-mapped quadrature phase shift keying (QPSK) with a block size of 256 bits, and gray-mapped 16-QAM with a block size of 128 bits. The nonlinear channel function $g(\cdot)$ was taken as the third order Volterra model. The coefficients and the input-output relationship equation is explicitly given as:

$$y_k = (0.780855+j0.413469)x_k + (0.040323-j0.000640)x_{k-1} + (-0.015361-j0.008961)x_{k-2} + (-0.04-j0.009)x_k x_k x_k^* + (-0.035+j0.035)x_k x_k x_{k-1} + (0.039+j0.022)x_k x_k x_{k-2}^* + (-0.001-j0.017)x_{k-1} x_{k-1} x_k^* + (0.018-j0.018)x_{k-2} x_{k-2} x_k^*.$$

Figure 5:
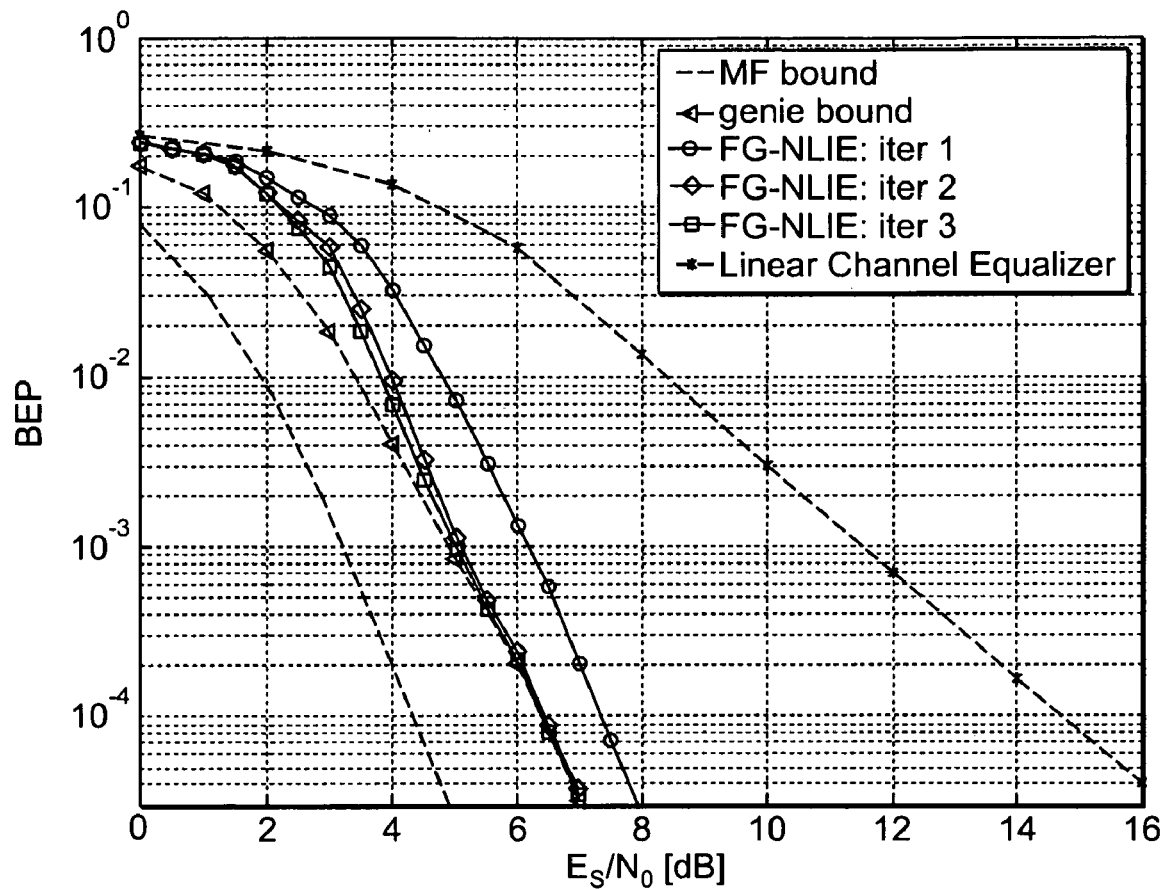
FIGS. 5-10 illustrate experimental and simulation results obtained with example embodiments of the present invention.

FIG. 5 shows the performance of the forward-backward equalizer (FG) for QPSK. The forward-backward equalizer (FG) performs as close as 1.5 dB to the matched filter bound. It shows that a linear channel equalizer has poor performance and the nonlinear iterative equalizer has a gain of almost 6.5 dB at BEP=$10^3$, and more than 10 dB at BEP=$10^{-4}$. BEP (bit error probability) performance for various iterations is plotted and significant iterative gain is visible. The performance of the iterative processing can also be assessed by comparing with the case of the forward-backward equalizer (FG) working with perfect a priori information (so called genie reference). Results show that after third iteration, the forward-backward equalizer (FG) almost achieves this genie bound.

Figure 6:
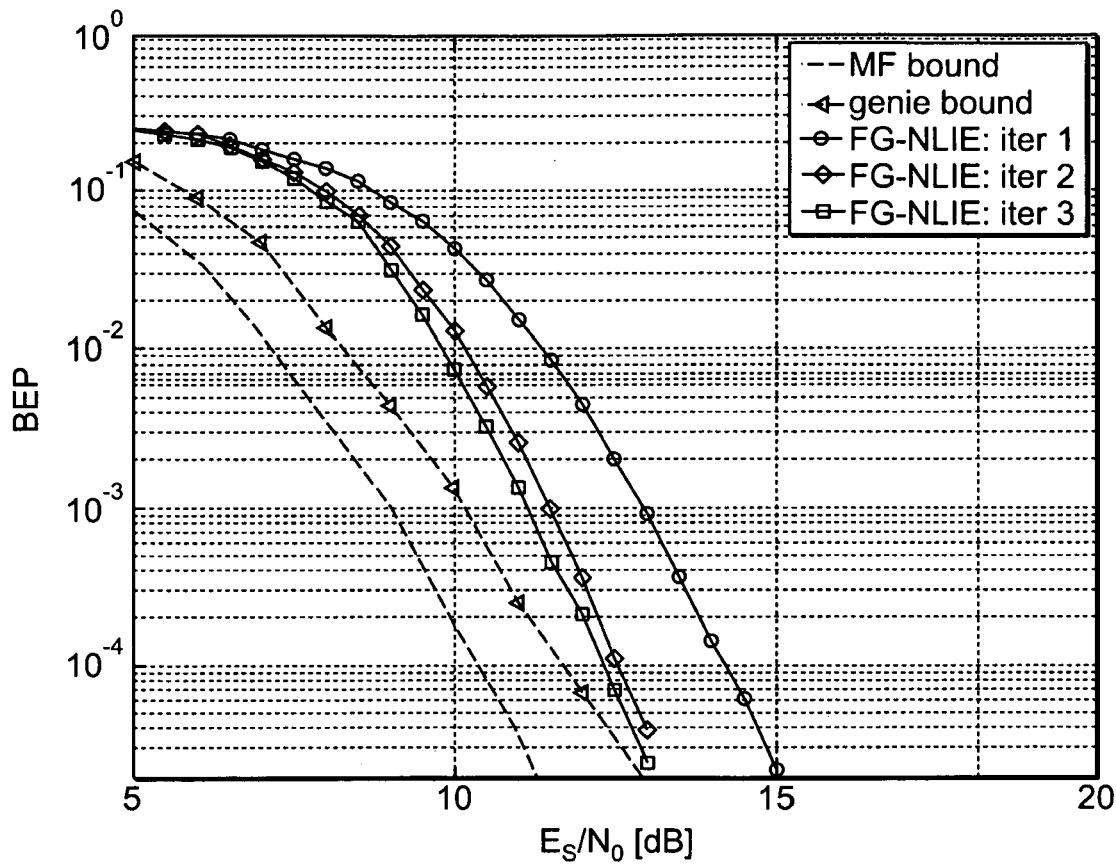

Performance analysis for 16-QAM is presented in FIG. 6. The results are compared with the matched filter bound and the genie bound. Again, the forward-backward equalizer (FG) approaches the performance of the genie bound at high SNR, and is about 1.5 dB away from the matched filter bound at BEP=$10^{-4}$. The iterative gain observed in 16-QAM is similar to the case of QPSK. It may be mentioned that iterative gain and the required number of iterations vary depending on the system setup. In this simulation setup, at low BEP (i.e., $10^{-3}$ or below), two iterations with a block size of 256 (for QPSK), and three iterations with a block size of 128 (for 16-QAM) were noted to perform close to the maximum iterative gain. For 16-QAM, the linear equalizer completely fails in the tested SNR range of up to 20 dB (results not shown).

Figure 7:
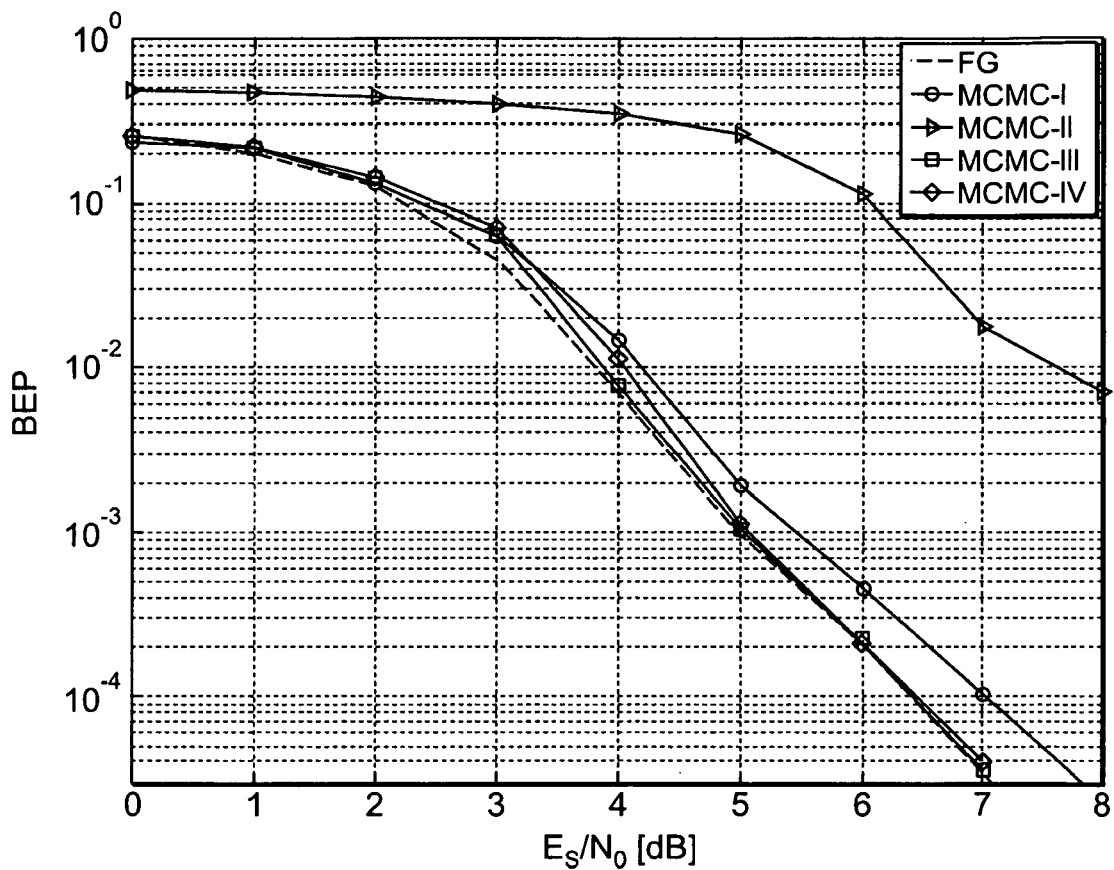

In case of QPSK, FIG. 7 presents results for the four example embodiment equalizers (MCMC I-IV) described above. The third equalization embodiment (MCMC-III) and the fourth equalization embodiment (MCMC-IV) provide the same performance as the forward-backward equalizer (FG) with $N_s$=10 samples and burn-in period of B=5. For the case of the fourth equalization embodiment (MCMC-IV), slice size of $S_1$=0 and $S_2$=2 is sufficient and it was noted to get only five or less distinct samples. Using $N_s$=10 and B=0 was observed to provide almost the same performance for the fourth equalization embodiment (MCMC-IV) around BEP=$10^{-4}$ and below. On the other hand, the first equalization embodiment (MCMC-I) takes a large number of samples, $N_s$=100 to provide a satisfactory performance at these BEP values. Intuitively, this is because the first equalization embodiment (MCMC-I) explores the state space without any knowledge of the channel observations or the a priori distributions, whereas the third equalization embodiment (MCMC-III) and the fourth equalization embodiment (MCMC-IV) generate samples exploiting the channel observations and the a priori distributions.

The second equalization embodiment (MCMC-II) was observed to perform poorly. Performance is shown in FIG. 7 for comparison purpose. Based on this performance and complexity behavior of the four equalization embodiments, the third equalization embodiment (MCMC-III) and the fourth equalization embodiment (MCMC-IV) are better suited for the nonlinear channel equalizer and we focus only on their performance henceforth.

Figure 8:
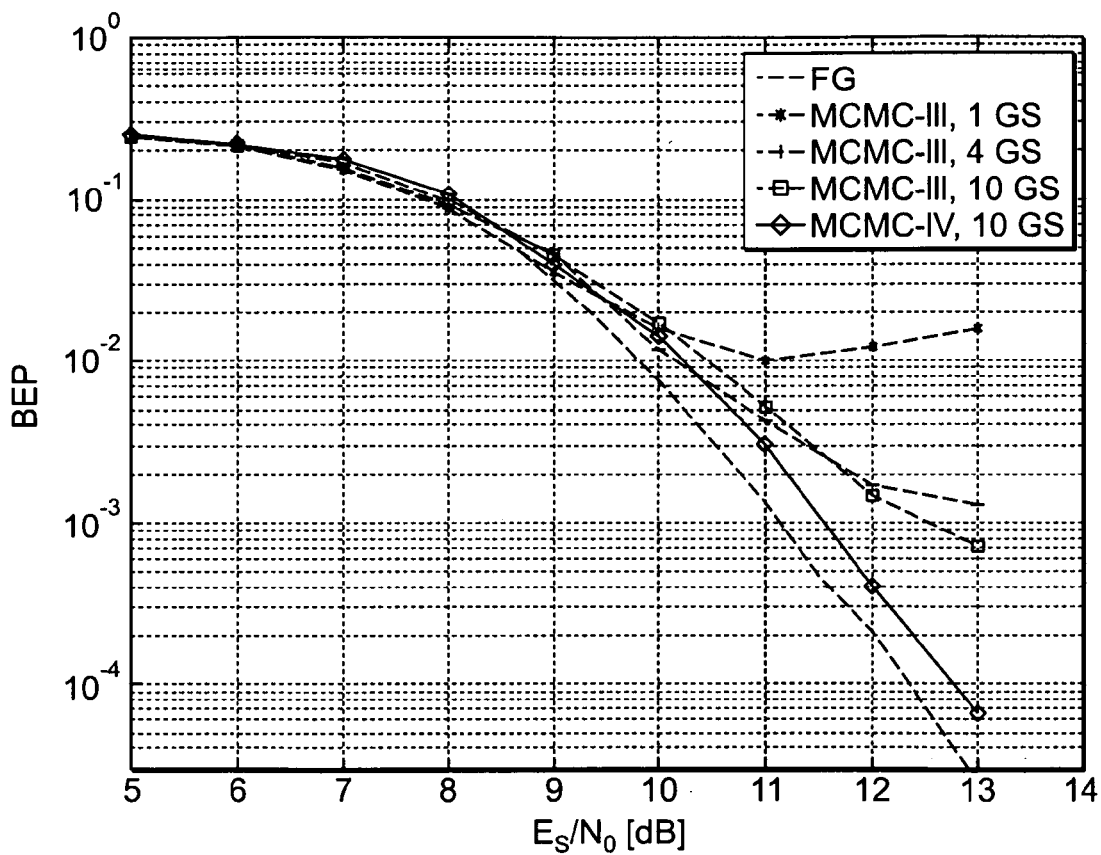

The results for the third equalization embodiment (MCMC-III) and the fourth equalization embodiment (MCMC-IV) for the case of 16-QAM are given in FIG. 8. It was observed that at high SNR values, the Gibbs sampler finds it hard to generate different samples and either gets stuck in the same state or takes very long to move from one state to the other. FIG. 8 shows that a single Gibbs sampler performs nicely up to BEP values of $10^{-2}$, corresponding to SNR of 10 dB but then degrades at higher SNRs. This is the case with both the third equalization embodiment (MCMC-III) and the fourth equalization embodiment (MCMC-IV).

As a remedy to this, multiple Gibbs samplers were used in parallel to draw the desired samples. The cost of running parallel Gibbs samplers is that there has to be allowed a burn-in period for every sampler. The results in FIG. 8 show the performance of both the third equalization embodiment (MCMC-III) and the fourth equalization embodiment (MCMC-IV). The third equalization embodiment (MCMC-III) achieves better performance with four parallel Gibbs samplers than with a single sampler, nevertheless an error floor is still visible below BEP=$10^{-3}$.

Using 10 parallel Gibbs samplers improves the situations to a great extent. The fourth equalization embodiment (MCMC-IV) provides excellent performance for all the considered SNR values: the plot shown for the fourth equalization embodiment (MCMC-IV) corresponds to 10 parallel Gibbs samplers with $N_s$=80 and B=20. Using $N_s$=60 provided almost the same performance at low BEP values. It may be mentioned that at an SNR values of 11 or 12 dB, only four parallel Gibbs samplers are sufficient to provide the same performance as that of the forward-backward equalizer (FG). The direct advantage of parallel Gibbs samplers in the medium SNR region, say 10-12 dB for 16-QAM, is reduction in the required number of samples. However, at higher SNR when BEP is as low as $10^{-4}$, parallel Gibbs samplers prove critical to achieve good performance.

Figure 9:
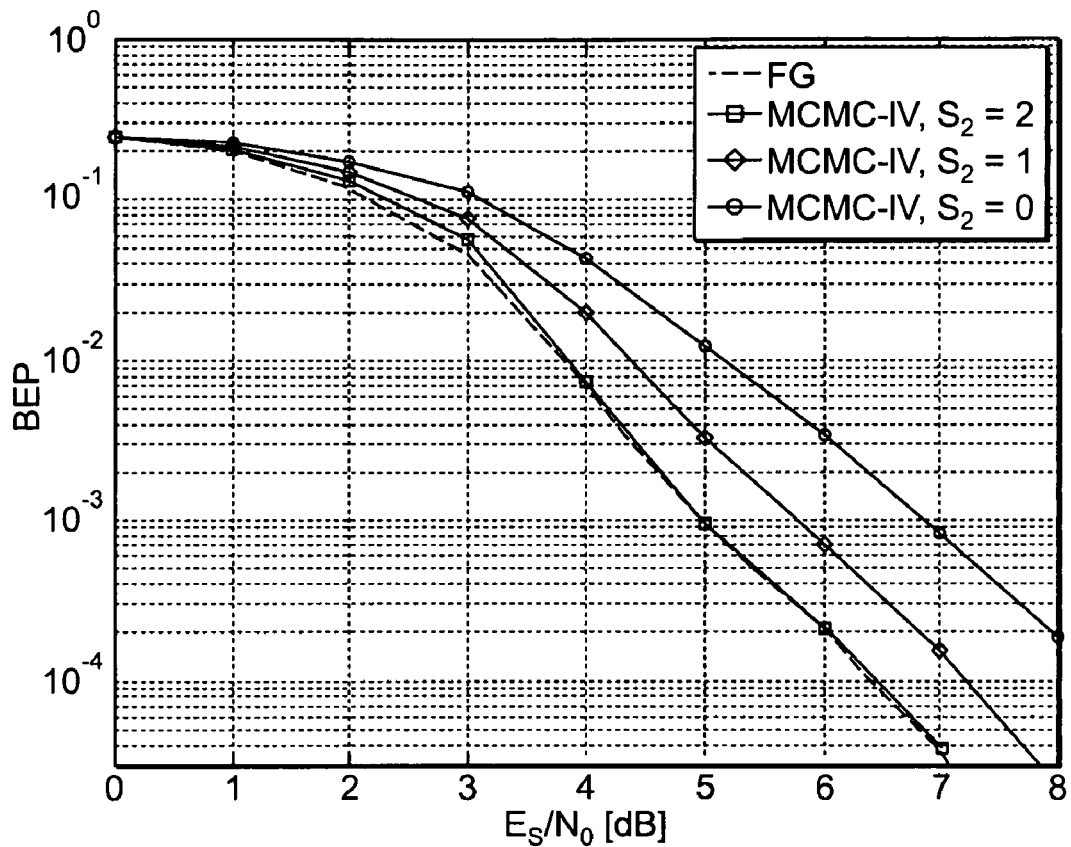

Another parameter in the first equalization embodiment (MCMC-I) and the fourth equalization embodiment (MCMC-IV) is slicing. The fourth equalization embodiment (MCMC-IV) provides good performance with a slice $S_1$=0 and $S_2$=2, for QPSK. However, in case of 16-QAM significant performance improvement can be obtained by increasing the slice size. For example, an order of magnitude gain is observed at $S_1$=2 and $S_2$=2 in high SNR region compared to $S_1$=0 and $S_2$=2. The four equalization methods provide a performance/complexity trade-off option, which can be controlled by the parameters $S_1$, $S_2$, the number of samples $N_s$ and the burn-in period B. For example, in the fourth equalization embodiment (MCMC-IV) for QPSK, decreasing $S_2$ from 2 to 1 (or 1 to 0) incurs a loss of approximately 1 dB at BEP of $10^{-3}$ and below, as shown in FIG. 9.

The computational complexity per symbol and the storage requirements of the equalization methods will not be discussed. Table[3] provides the detailed view, where parameter S accounts for the slicing, defined as S=$S_1$+$S_2$+L.

TABLE 3

| | Computations | Storage |
|---|---|---|
| FG | $18M^{L+1}$ | $3KM^{L+1}$ |
| MCMC-I | $4N_sMS + N_sS$ | $KM + M^{L+1}$ |
| MCMC-II | $4(N_s + B)MS + N_s$ | $K(M + N_s/4) + M^{L+1}$ |
| MCMC-III | $4(2N_s + B)MS$ | $K(M + N_s/4) + M^{L+1}$ |
| MCMC-IV | $4(N_s + D_s + B)MS + D_sS$ | $K(M + N_s/4) + M^{L+1}$ |

In case of QPSK and small channel memory, the forward-backward equalizer (FG) is not very intensive and it may take fewer computations than the four equalization embodiments, however for the 16-QAM even at L=2, the four equalization embodiments prove more efficient.

Figure 10:
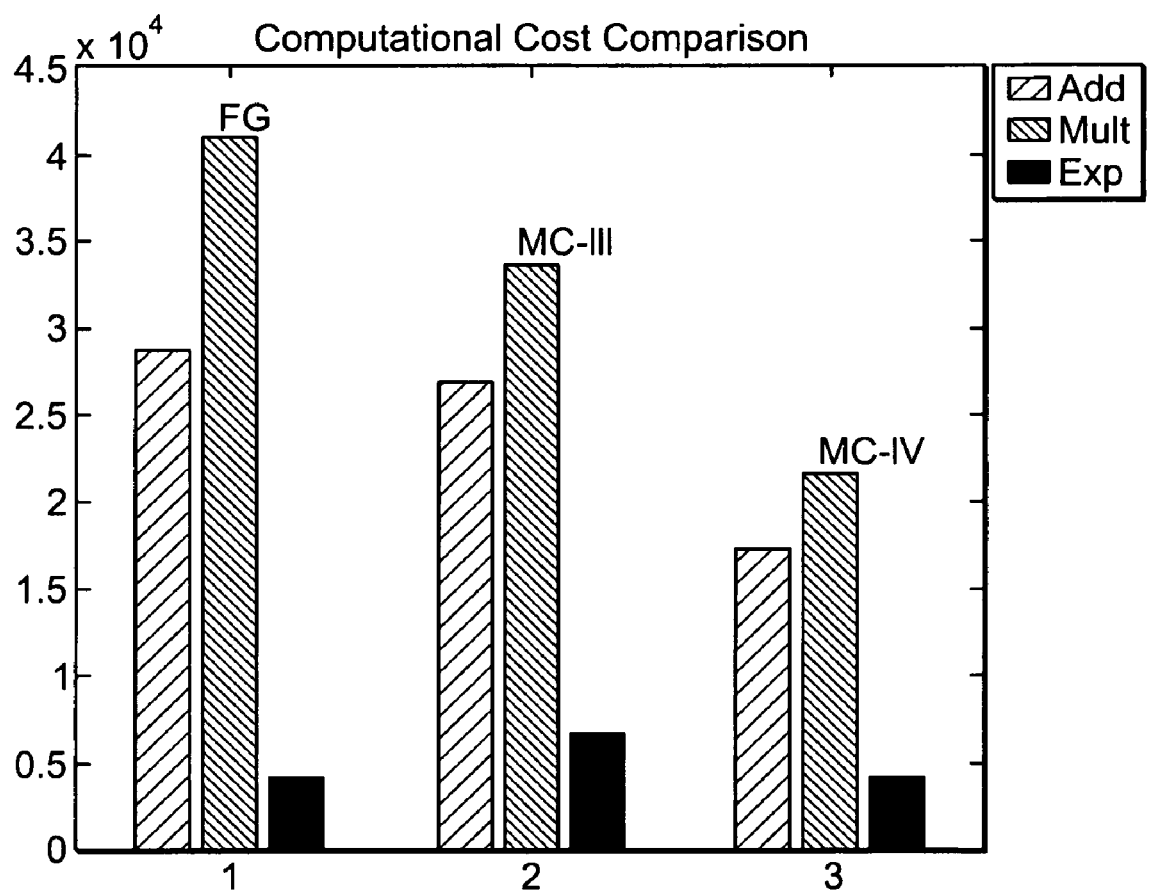

FIG. 10 shows a comparison of the computational cost of all the methods in this thesis. It shows that the third equalization embodiment (MCMC-III) and the fourth equalization embodiment (MCMC-IV) take fewer computations than the forward-backward equalizer (FG). The forward-backward equalizer (FG) has significantly higher storage requirements than the four equalization embodiments and the difference grows exponentially with the channel memory and the constellation size. For example, in case of 16-QAM, the four equalization embodiments are two orders of magnitude better than forward-backward equalizer (FG) in terms of their storage requirements.

As regards to the computational cost of the forward-backward equalizer (FG), it also grows as $M^L$. Therefore, it is a viable option only when channel memory and constellation size are relatively small. On the other hand, the four equalization embodiments have much smaller memory requirements than the forward-backward equalizer (FG). Their computational complexity depends on $N_s$. When M and L are relatively small, the factor $M^L$ and $N_sM^L$ can be close, hence making the four equalizer embodiments and the forward-backward equalizer (FG) of the same complexity. However, as M and L increase, the four equalizer embodiments prove computationally a lot more efficient.

It should be appreciated that any of the four embodiments may be employed in the equalization process used to recover the transmitted symbol sequence given the received signal. One of the for equalization embodiments may be chosen on error performance or based on how much error may be tolerated for a particular application. One of the four equalization embodiments may also be chosen based on system requirements. For example, the equalization method described in the First Equalization embodiment may allow for ease in sampling but may also be a complex computational method. The equalization method described in the Second Equalization embodiment may use complex sampling but allow for ease in computation. The equalization described in the Third and Fourth equalization methods may provide middle ground solutions, in terms of complexity, as compared to the First and Second Equalization embodiments.

It should be understood that certain processes, such as the equalization process, disclosed herein may be implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for determining an input sequence to a finite state system given corresponding outputs and a statistical model of the finite state system, the method comprising:
    sampling from a distribution defined over the input sequence to the finite state system to provide a subset of samples;
    applying a function to the samples to produce an output of the function;

summing the output of the function over at least a subset of the samples;

performing an arithmetic operation to results of the summing over the subset of the samples to determine a most likely input sequence to the finite state system; and reporting the most likely input sequence.

2. The method of claim 1 wherein the distribution is a uniform distribution.

3. The method of claim 1 wherein the distribution is a joint a posteriori distribution.

4. The method of claim 1 wherein the function is a joint a posteriori distribution.

5. The method of claim 1 wherein the function is an indicator function.

6. The method of claim 1 wherein the function is a conditional marginal a posteriori distribution.

7. The method of claim 1 wherein the sampling further comprises sampling in accordance with a Gibb sampling technique.

8. The method of claim 1 further comprising normalizing a result of the summing to obtain an a posteriori distribution.

9. The method of claim 1 wherein applying the function further includes applying the function to a received signal.

10. The method of claim 1 further comprising choosing a sampling technique and/or function type based an error tolerance.

11. The method of claim 1 wherein performing the arithmetic operation further comprises determining a mode of the results of the summing.

12. The method of claim 1 wherein sampling from the distribution further comprises removing duplicate samples.

13. The method of claim 1 wherein the distribution is a joint a posteriori distribution over all possible input sequences and wherein the function is an indicator function constraining the input being considered at a given time instant.

14. The method of claim 1 wherein the distribution is a uniform distribution defined over all input sequences, and wherein the function is a joint a posteriori distribution defined over all the input sequences.

15. The method of claim 1 wherein the distribution is a joint a posteriori distribution over all possible input sequences and wherein the function includes a conditional marginal a posteriori distribution of the input under consideration given the input sequences corresponding to all time instances not including a current time instant.

16. The method of claim 1 wherein the distribution is a joint a posteriori distribution for all input sequences, and wherein the function includes a joint a posteriori distribution defined over all possible input sequences, the method further including, removing duplicate samples to produce distinct samples.

17. The method of claim 1 further including choosing the distribution and the function based on a performance parameter of a system that includes the finite state system.

18. The method of claim 1 employed in a communications system selected from the group consisting of: wireless, wireline, free space optical, fiber-based optical, and storage system.

19. An apparatus for determining an input sequence to a finite state system given corresponding outputs and a statistical model of the finite state system, the apparatus comprising:

a sampler configured to sample from a distribution defined over the input sequence to the finite state system and to provide a subset of samples;

a processor configured to apply a function to the samples to produce an output of the function;

a summing unit configured to sum the output of the function over at least a subset of the samples;

a selecting unit configure to perform an arithmetic operation to results of the summing over the subset of the samples to determine a most likely input sequence to the finite state system; and a reporting unit configured to report the most likely input sequence.

20. The apparatus of claim 19 wherein the distribution is a uniform distribution.

21. The apparatus of claim 19 wherein the distribution is a joint a posteriori distribution.

22. The apparatus of claim 19 wherein the function is a joint a posteriori distribution.

23. The apparatus of claim 19 wherein the function is an indicator function.

24. The apparatus of claim 19 wherein the function is a conditional marginal a posteriori distribution.

25. The apparatus of claim 19 wherein the sampler is further configured to sample in accordance with a Gibb sampling technique.

26. The apparatus of claim 19 wherein the summing unit is further configured to normalize a result of the summing to obtain an a posteriori distribution.

27. The apparatus of claim 19 wherein the processor is further configured to apply the function to a received signal.

28. The apparatus of claim 19 wherein the processor is further configured to choose the function from among multiple functions based on an error tolerance.

29. The apparatus of claim 19 wherein the sampler is further configured to choose a sampling technique based on an error tolerance.

30. The apparatus of claim 19 wherein the arithmetic operation is a mode.

31. The apparatus of claim 19 wherein the sampler is further configured to eliminate duplicate samples.

* * * * *